United States Patent
Kreiner et al.

(10) Patent No.: US 7,487,224 B2
(45) Date of Patent: Feb. 3, 2009

(54) METHODS AND SYSTEMS FOR ROUTING REQUESTS USING EDGE NETWORK ELEMENTS

(75) Inventors: Barrett Kreiner, Norcross, GA (US); Jai Menon, Alpharetta, GA (US); Kim Littrell, Marietta, GA (US); Ronald Perrella, Norcross, GA (US)

(73) Assignee: AT&T Intelletual Property I, L.P., Reno, NV (US)

( * ) Notice: Subject to any disclaimer, the term of this patent is extended or adjusted under 35 U.S.C. 154(b) by 256 days.

(21) Appl. No.: 10/324,179

(22) Filed: Dec. 19, 2002
(Under 37 CFR 1.47)

(65) Prior Publication Data
US 2005/0198366 A1   Sep. 8, 2005

(51) Int. Cl.
*G06F 15/16* (2006.01)
(52) U.S. Cl. ..................................... 709/218
(58) Field of Classification Search ................. 709/229, 709/217–219; 707/10
See application file for complete search history.

(56) References Cited

U.S. PATENT DOCUMENTS

| | | | |
|---|---|---|---|
| 5,893,116 A * | 4/1999 | Simmonds et al. | 707/201 |
| 6,185,598 B1 * | 2/2001 | Farber et al. | 709/200 |
| 6,654,807 B2 * | 11/2003 | Farber et al. | 709/225 |
| 6,876,656 B2 * | 4/2005 | Brewer et al. | 370/392 |
| 6,981,029 B1 * | 12/2005 | Menditto et al. | 709/217 |
| 7,111,300 B1 * | 9/2006 | Salas et al. | 718/105 |
| 7,114,008 B2 * | 9/2006 | Jungck et al. | 709/246 |
| 7,152,112 B2 * | 12/2006 | Juster | 709/229 |
| 7,216,176 B1 * | 5/2007 | Still et al. | 709/229 |
| 7,243,138 B1 * | 7/2007 | Majkut et al. | 709/219 |
| 7,334,039 B1 * | 2/2008 | Majkut et al. | 709/229 |
| 7,340,505 B2 * | 3/2008 | Lisiecki et al. | 709/217 |
| 7,356,841 B2 * | 4/2008 | Wilson et al. | 726/15 |
| 2006/0015574 A1 * | 1/2006 | Seed et al. | 709/219 |
| 2007/0255829 A1 * | 11/2007 | Pecus et al. | 709/225 |

* cited by examiner

*Primary Examiner*—Andrew Caldwell
*Assistant Examiner*—Michael D Meucci

(57) ABSTRACT

The present invention utilizes central offices, located on the edge of a network to route requests along the edge of the network. Once an edge client receives a request for information, the edge client makes a determination as to whether the edge client can provide the information requested. If the edge client cannot provide the information requested, then the edge client determines whether a routing instruction applies which specifies a second edge client. If the routing instruction applies, then the request is routed to the second edge client.

17 Claims, 4 Drawing Sheets

METHODS AND SYSTEMS FOR ROUTING REQUESTS USING EDGE NETWORK ELEMENTS

FIELD OF THE INVENTION

This invention generally relates to routing within a network, and more particularly relates to reducing the traffic on routes to a network core by routing requests to elements on the edge of the network.

BACKGROUND OF THE INVENTION

Nowadays, internet access is both popular and easy to obtain. Anyone with a personal computer, modem and telephone line may sign up with an internet access provider for access to the internet. The magnitude and availability of information on the internet continues to increase the popularity of the internet. In turn, the popularity of the internet has led to tremendous growth in the number of internet users, as well as an increase in the amount of time each user spends on the internet.

For many users of the internet, an increase in the volume of traffic on networks connected to the internet translates into slower transmission of information. A high volume of traffic may slow the rate of speed associated with transmitting information over the networks thereby aggravating or frustrating internet users. Additionally, many internet users pay for internet service based on hourly network usage. Therefore, the slow transmission of information translates into the user getting less for his or her money.

For network service providers, there are several drawbacks associated with the increasing volume of network traffic. Traffic on the network may cause a delay in receiving a request from a subscriber, as well as a delay in a service provider's ability to respond to the subscriber request. Moreover, network service providers realize that when internet service is too slow, subscribers may become frustrated and decide to cancel their subscription.

Service providers generally attempt to fulfill the requests of subscribers as fast as possible. Network service providers are typically able to provide requested information more quickly when the requested information is stored within the network. Thus, network service providers often choose to store data within the network that may be frequently requested by service subscribers.

The ability to rapidly provide subscribers with requested information gives the network service providers an incentive to store greater quantities of information within the network. However, storing greater quantities of information requires additional storage space, which in turn generally increases the expenses of the service provider. Thus, the increasing volume of network traffic forces service providers to strike a balance between acceptable transmission delays, available data storage space and the cost of utilizing additional storage space.

Network service providers have developed numerous approaches in an attempt to reduce transmission delays. In one approach, a central office receives a request for information from a user. The central office simply acts as a middleman between the user and the network core. Thus, the central office forwards the request to the network core. Once received by the network core, the request may be fulfilled by the information contained within the network core. However, if the network core cannot fulfill the request, the network core may request the information from another element, such as another network or a larger information store.

This approach is prone to the "straight-to-core" drawback. As it's name suggests, the straight-to-core drawback occurs when a central office routes a request directly to the network's core. By routing all incoming requests directly to the network core, the network core may become overwhelmed by the large volume of requests. Moreover, the transmission routes between the central office and the network core may become overcrowded. Thus, requests that are subject to the straight-to-core drawback may be delayed at several points during transmission. For example, the request may take longer to arrive at the network core due to traffic on the transmission route to the network core. The request also may be delayed once it arrives at the network core, if the core has a backlog of requests to fulfill. Additionally, once fulfilled, the request may be delayed due to traffic in the route back to the central office.

In another approach, the central office forwards a request to a client, referred to as a "host," attached to the rest of the clients within the network. Once the host has received the request, the host may provide the request to any client within the network. Typically, the host will provide the request to the client with the least traffic. Alternatively, the host may provide the request to a specific client based on the subject matter of the particular request.

This approach is susceptible to excessive network traffic at the host, referred to as the "host-bottleneck" drawback. The host-bottleneck drawback occurs when the host receives requests at a faster rate than the rate at which the host satisfies the requests. Thus, the requests begin to create a backlog while waiting to be processed by the host. The host-bottleneck drawback is even more problematic if the fulfilled requests returning from the clients are also required to pass through the host.

Another drawback of this approach is the "offline-host" drawback. The offline-host drawback occurs when the host is offline or not functioning properly. Thus, any approach that utilizes a host to receive messages from the users may suffer to some extent from the offline-host drawback.

In a variation of the host approach, an initial request from a user is forwarded to a host. However, the host does not receive any of the subsequent requests from that particular user. Instead, based on the initial request, the host selects a client to receive the subsequent requests from that particular user.

This variation of the previous approach reduces the host-bottleneck drawback, however, this approach creates other drawbacks. One drawback created by this approach is the "atypical request" drawback. The atypical request drawback occurs when a user's initial request is substantially different from the majority of the user's subsequent requests. The atypical request drawback is most noticeable and problematic when a user's subsequent request is much larger than the user's initial request. Thus, the client may become overloaded with requests because the traffic from a particular user is heavier than anticipated by the host.

This approach may also suffer from the offline-host drawback. The network will not be capable of receiving a request and selecting an appropriate client whenever the host is offline. However, contrary to the previous approach, in this approach the off-line host drawback will only interfere with the processing of initial requests from new users.

In yet another approach, the central office may be instructed to provide a request to a particular client based on the subject matter of the request. Alternatively, the central office may automatically reroute a request from one particular client to another client during predetermined time periods. For example, a network may include a client that is typically busy between 11:00 AM and 1:00 PM. The central office may be instructed to reroute a portion of the requests initially directed to the busy client to a client that is typically not busy between the hours of 11:00 AM and 1:00 PM.

One drawback of this approach, referred to as the "rigid instruction" drawback, is that the network does not adjust when the circumstances within the network are temporarily altered. Thus, the central office will rigidly follow the instructions even though it may be more efficient to do otherwise. In the example above, there will be instances when the client that is typically busy between 11:00 AM and 1:00 PM is not busy during those hours. However, the central office will rigidly follow the provided instructions and continue to reroute the requests away from that particular client.

One drawback that may occur in several of the current approaches is termed the "busier neighbor" drawback. The busier neighbor drawback may occur in any approach where an overloaded client is programmed or directed to reduce its load by forwarding a request to a neighboring client. A neighboring client is typically determined by geographic proximity. For example, the neighboring client may be within the same room or office building. As another example, the closest neighboring client may be in a different city.

Frequently, the request from an overloaded client is forwarded without considering the workload of the neighboring client. Hence, there are occasions when an overloaded client forwards a request to an equally busy or busier neighboring client. Forwarding the request to a busier neighbor client further exasperates the problems related to traffic within the network.

In sum, there is a need to fulfill requests for information from a network while reducing the load on the network core and the traffic on routes within the network. There is a further need to satisfy requests from the network in the shortest period of time.

SUMMARY OF THE INVENTION

The present invention utilizes central offices and a network core which function respectively as clients and a server in a client-server network to reduce the load on the network core. The network core (or server) performs the bulk of centralized or generalized tasks in the network. The network core is connected to at least one central office and each central office is connected to at least one other central office.

A central office is generally a network (referred to herein as a "central office network") consisting of a server, a data store and a router. The central offices are located at the boundary of the network and are therefore referred to as edge central offices or edge clients.

A server of a central office network (referred to herein as a central office server) functions as a typical server in a client-server network. Thus, a central office server performs the bulk of the centralized or generalized tasks in the central office network.

A central office network comprises a data store located within the central office server. Alternatively, a central office network comprises an external data store associated with and/or connected to the central office server. A data store records and/or stores information for later retrieval and use. Information is typically stored in the data store to provide a requestor with faster access to the information or to minimize network traffic. Thus, requests for the frequently requested information may be fulfilled at the central office network without having to provide the request for information to the network core or another element within the network.

A central office network in the present invention also contains a router. The router in a central office network directs the flow of a request to the appropriate entity within the network. For example, a router may direct a request to another central office or to the network core. Additionally, a router is associated with a routing table which contains routing instructions which assist the router in routing the request. The routing instructions are based on routing parameters that correspond to various characteristics of the request and/or the network. For example, routing parameters can correspond to a specified interval of time, a specified load on the central office, or a specified subject matter within a request.

Once a request is received at a central office, a determination is made as to whether the central office can fulfill the request. A central office may be able to fulfill the request with information contained within or associated with the central office data store.

If the central office cannot fulfill the request, a determination is made as to whether a routing instruction applies. A routing instruction applies if the request or the network conditions correspond to a routing parameter in the routing table. If a routing instruction does not apply, then the request is routed based on a default routing instruction. The default routing instruction may specify that the request be routed to another central office at the edge of the network. The central office may be selected randomly or may be selected according to a predetermined order, e.g., round robin of nearby central offices.

If the central office is able to satisfy only a portion of a request, then the satisfied portion of the request may be stored in the central office until the unsatisfied portion of the request is satisfied by another network element. Once both portions of the request are satisfied, the satisfied request is provided to the requestor. Alternatively, the satisfied portion of the request may be immediately provided to the requestor and the unsatisfied portion of the request may be provided when it is satisfied.

These and other aspects, features and advantages of the present invention may be more clearly understood and appreciated from a review of the following detailed description of the disclosed embodiments and by reference to the drawings and claims.

DETAILED DESCRIPTION

The methods and systems according to the present invention contemplate the interaction of a server and one or more clients within a client-server network. The "client-server" configuration of a client-server network may refer to a hardware configuration, to a software configuration, or to a combination thereof.

Generally, a "client" in a hardware configuration is a computer, such as a personal computer (PC), intelligent device, or workstation. The client may perform tasks during which the client may request information or otherwise use the resources of another object, such as the server or another network element, to accomplish such tasks.

Generally, a "server" in a hardware configuration is a computer or other intelligent device. A server typically performs the bulk of centralized or generalized tasks in the network and may have more memory, processing speed, and storage than a client. Alternatively, the server may perform specialized tasks such as distributing electronic mail or printing.

In a software configuration, a "server" typically is a program that provides data, stores data, or provides some service to other programs to which the server is connected. A server may be a program with higher priority, greater memory, or greater capabilities compared to the other programs used on the network. A server also may be a program that includes specialized capabilities or has higher priority with respect to certain tasks or functions.

A "client" in the software configuration typically makes use of data, processing, storage, or other resources of another program. A client may be used to communicate with a source or destination through a higher priority, more powerful, more capable or different program.

Any given device or program may be capable of acting as a client and/or a server depending on the role the device or program plays. In other words, the terms "client" and "server" refer to the role a device or program performs during a specific connection or communication with another device, program or element.

Exemplary Operating Environment

Figure 1:
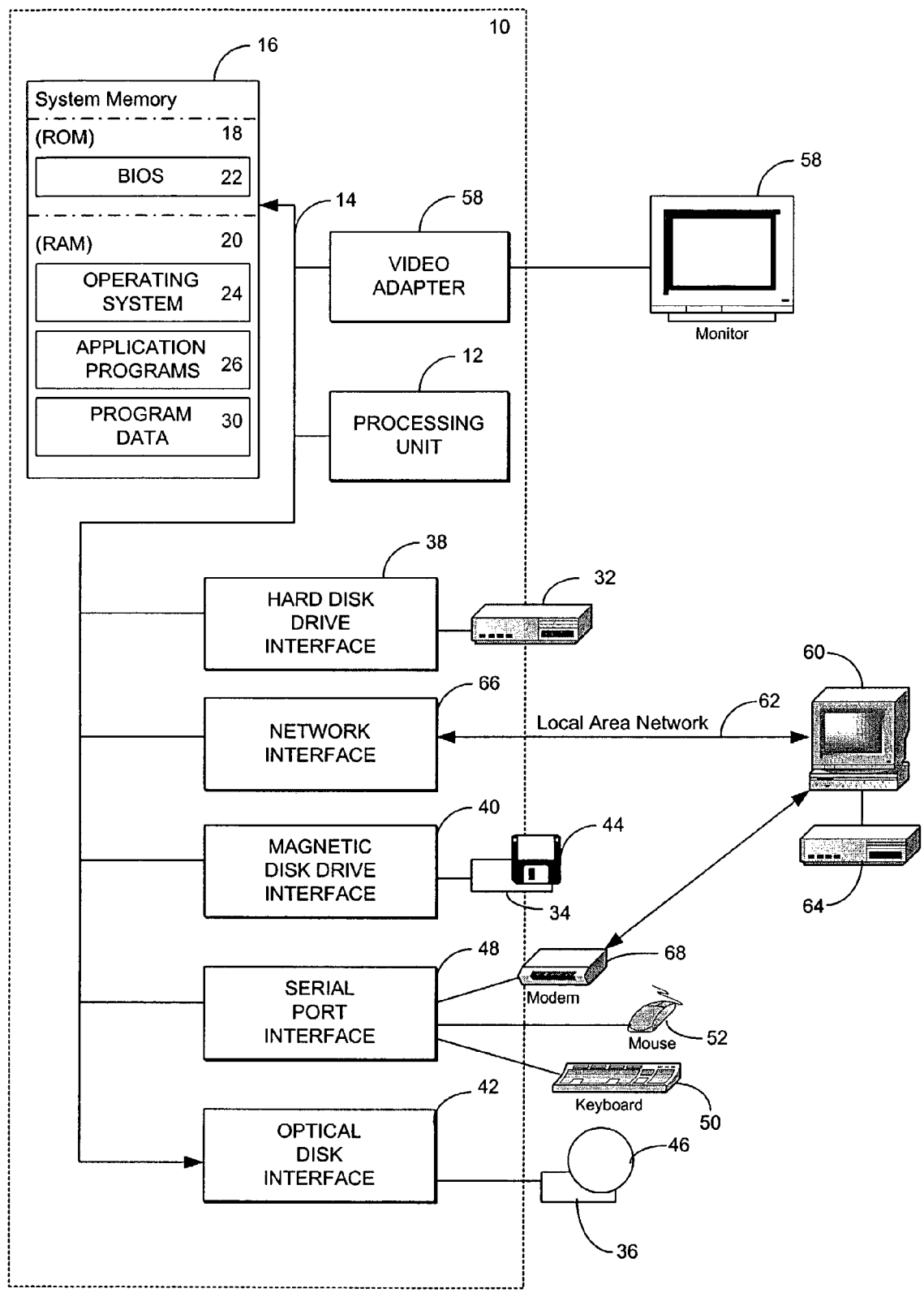
FIG. 1 is a block diagram of an exemplary computing system, in accordance with an embodiment of the invention.

Turning to the drawings in which like numbers reference like parts or action, in the several figures, FIG. 1 of this specification illustrates an exemplary environment for implementing the invention in or through use of a computer, such as a personal computer (PC). For example, the invention may be implemented through a program running on a PC. The invention also may be practiced with other computer system configurations, including hand-held devices, multiprocessor systems, microprocessor based or programmable consumer electronics, mini-computers, mainframe computers, etc.

A program may include routines, programs, components, data structures, etc. that implement certain abstract data types, perform certain tasks, actions, or tasks. In a distributed computing environment, the program (in whole or in part) may be located in local memory, or in other storage. In addition, or in the alternative, the program (in whole or in part) may be located in remote memory or in storage to allow for the practice of the invention where tasks are performed by remote processing devices linked through a communications network.

FIG. 1 illustrates a PC 10 including a processor (also referred to as a processing means or processing unit) 12 joined by a system bus 14 to a memory (also referred to as system memory) 16. The memory 16 may include read only memory (ROM) 18 and random access memory (RAM) 20. The ROM 18 stores the basic input/output system (BIOS) 22, which contains basic routines that aid in transferring information between elements within the PC 10 during start-up, and at other times. The RAM 20 may store program modules and drives. In particular, the RAM 20 may include an operating system 24, one or more application programs 26, program data 30, a web browser program (not illustrated), etc.

The PC 10 also may include a plurality of drives interconnected to other elements of the PC 10 through the system bus 14 (or otherwise). Exemplary drives include a hard disk drive 32, a magnetic disk drive 34, and an optical disk drive 36. Specifically, each disk drive may be connected to the system bus 14 through an appropriate interface (respectively, a hard disk drive interface 38, a magnetic disk drive interface 40, and an optical drive interface 42). Further, the PC 10 may include non-volatile storage or memory through the drives and their associated computer-readable media. For example, the magnetic disk drive 34 allows for the use of a magnetic disk 44; and the optical disk drive 36 allows for the use of an optical disk 46. Other types of media that are readable by a computer, e.g., magnetic cassettes, digital video disks, flash memory cards, ZIP cartridges, JAZZ cartridges, etc., also may be used in the exemplary operating environment.

In addition, the PC 10 may include a serial port interface 48 connected to the system bus 14. The serial port interface 48 connects to input devices that allow commands and information to be entered. These input devices may include a keyboard 50, a mouse 52, and/or other input device. Pens, touch-operated devices, microphones, joysticks, game pads, satellite dishes, scanners, etc. also may be used to enter commands and/or information. The input devices also may be connected by other interfaces, such as a game port or a universal serial bus (USB). Further, the PC 10 may include a monitor or other display screen 56. The monitor 56 is connected through an interface such as a video adaptor 58 to the system bus 14. The PC 10 may include other peripheral and/or output devices, such as speakers or printers (not illustrated).

The PC 10 may be connected to one or more remote computers 60, and may operate in a network environment. The remote computer 60 may be a PC, a server, a router, a peer device or other common network node, and may include many or all of the elements described in relation to the PC 10. The connection between the PC 10 and the remote computer 60 may be through a local area network (LAN) 62 and/or a wide area network (WAN) 64. The PC 10 is connected to the LAN 62 through a network interface 66. With respect to the WAN 64, the PC 10 may include a modem 68 or other device to channel communications over the WAN 64, or global data communications network (e.g., the internet). The modem 68 (internal or external) is connected to the system bus 14 via the serial port interface 48. The network connections illustrated in FIG. 1 are exemplary and other ways of establishing a communications link between the PC 10 and a remote computer 60 may be used.

Network Configuration

Figure 2:
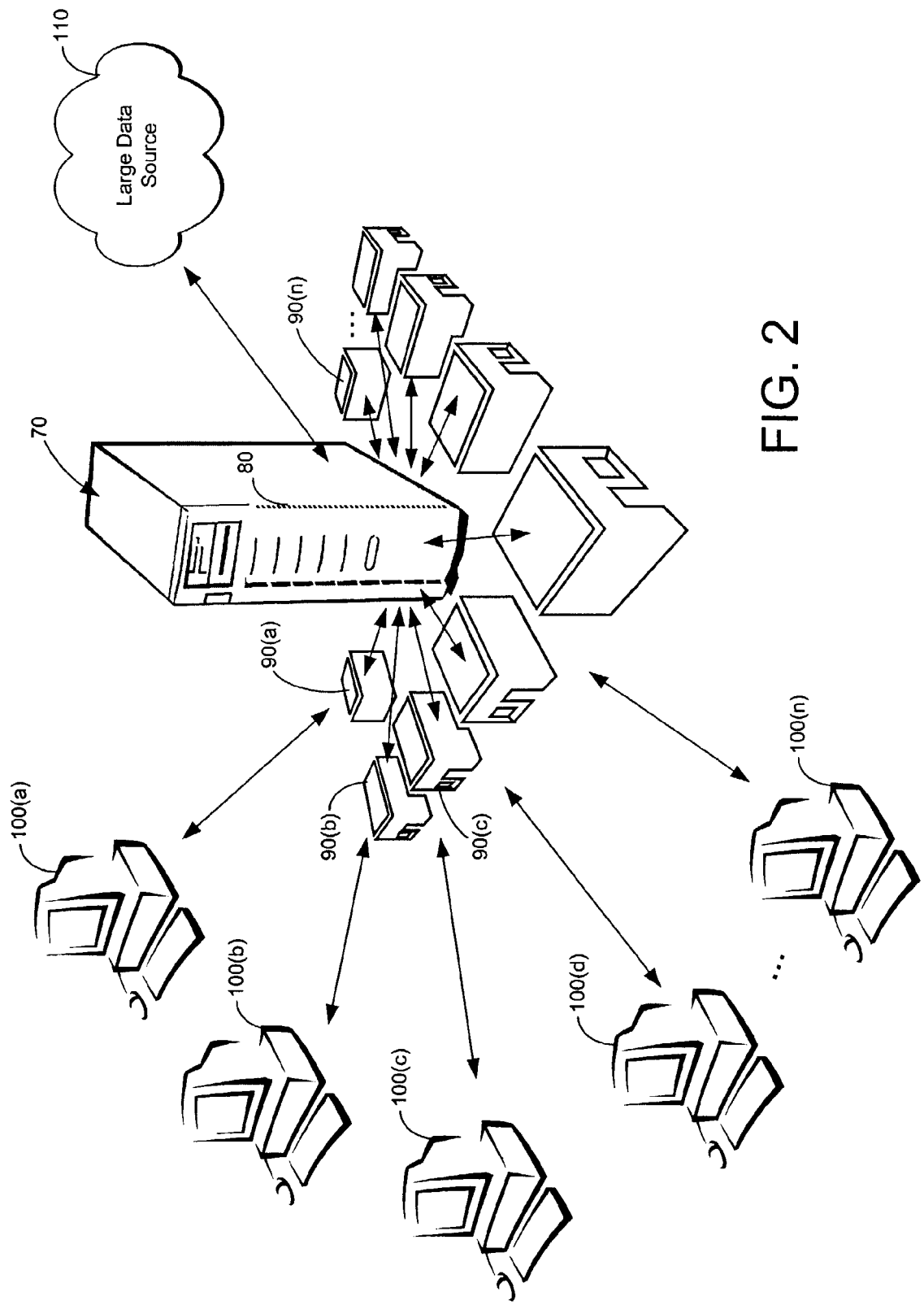
FIG. 2 is a block diagram of an exemplary network, in accordance with an embodiment of the invention.

An exemplary network is illustrated in FIG. 2. The network includes a number of requestors 100($a$)-($n$), a number of central offices 90($a$)-($n$) and a network core 80. The central office and the network core function respectively as clients and a server in a client-server network 70 (referred to herein as the network). In one embodiment, the network core (or server) 80 performs the bulk of the centralized or generalized tasks in the network and has more memory, processing speed, and storage than the other devices on the network. The network core may itself comprise a client-server network. For example, the network core may consist of servers, clients, data storage, a large centralized server and/or federated servers. The network core may also include a program with higher priority or greater capabilities than other programs within the network. Thus, the network core provides data, stores data, and/or provides some service to the other programs to which the network core is connected.

The network core is connected to at least one central office. The connection may be a direct connection or may be through other intervening elements. The network core and the central offices may be connected by LAN, WAN, satellite, or in any other suitable manner.

A central office may be a personal computer, a workstation, a server, a switch or a collection of switches. A switch may be a device which selects a path or circuit for information or data. In one embodiment, the central offices perform switching functions for a telephone network. A central office can include a client-server network. If so, then the central office functions as both a client in a client-server network 70 and as a separate client-server network. As discussed further in relation to FIG. 3, the client-server network of the central office (referred to herein as a central office network 91) generally comprises a server, a data store and a router.

The central offices 90(a)-(n) are located at the "edge" of the network 70 and may therefore be referred to as edge central offices or edge clients. Elements on the edge of a network are defined as the elements at the boundary of the network. In addition to being connected to the network core 80, each central office is connected to at least one other central office (not shown). In one embodiment, each central office is connected to two other central offices so that the central office interconnections resemble a circle. The central offices may be interconnected in other manners. For example, three central offices may be connected to the network core 80 and to the other two central offices.

Still referring to FIG. 2, the requestors 100(a)-(n) are connected to the network 70 via central offices 90(a)-(n). Although FIG. 2 illustrates that one requestor is connected to one central office, a central office can accommodate multiple requesters. In addition, a requestor may itself include a network. A requestor submits a request for information to the network. A requester may submit a request for information in response to a user's actions, in response to the detection of an event, or at a predetermined time. The requesters may be connected to the network utilizing any method of connection. For example, a requestor may be connected to the network by a cable line, phone line, DSL line, or a wireless connection.

In the exemplary embodiment illustrated in FIG. 2, the network 70 may also be connected to another element, such as a large data source 110. The large data source may include a database, a global data communication network or the internet. The large data source is generally connected to the network at the network core 80. However, the large data source may be connected to the network at any point or points within the network. The large data source may provide information that is not available within the network to the network core. For example, the large data source may provide information to the network core which, if stored in the network core, may take up too much storage space. As another example, the large data source may serve as a back-up for a central office and provide information that is typically provided by a central office when the central office is busy or off-line.

Central Office Network

Figure 3:
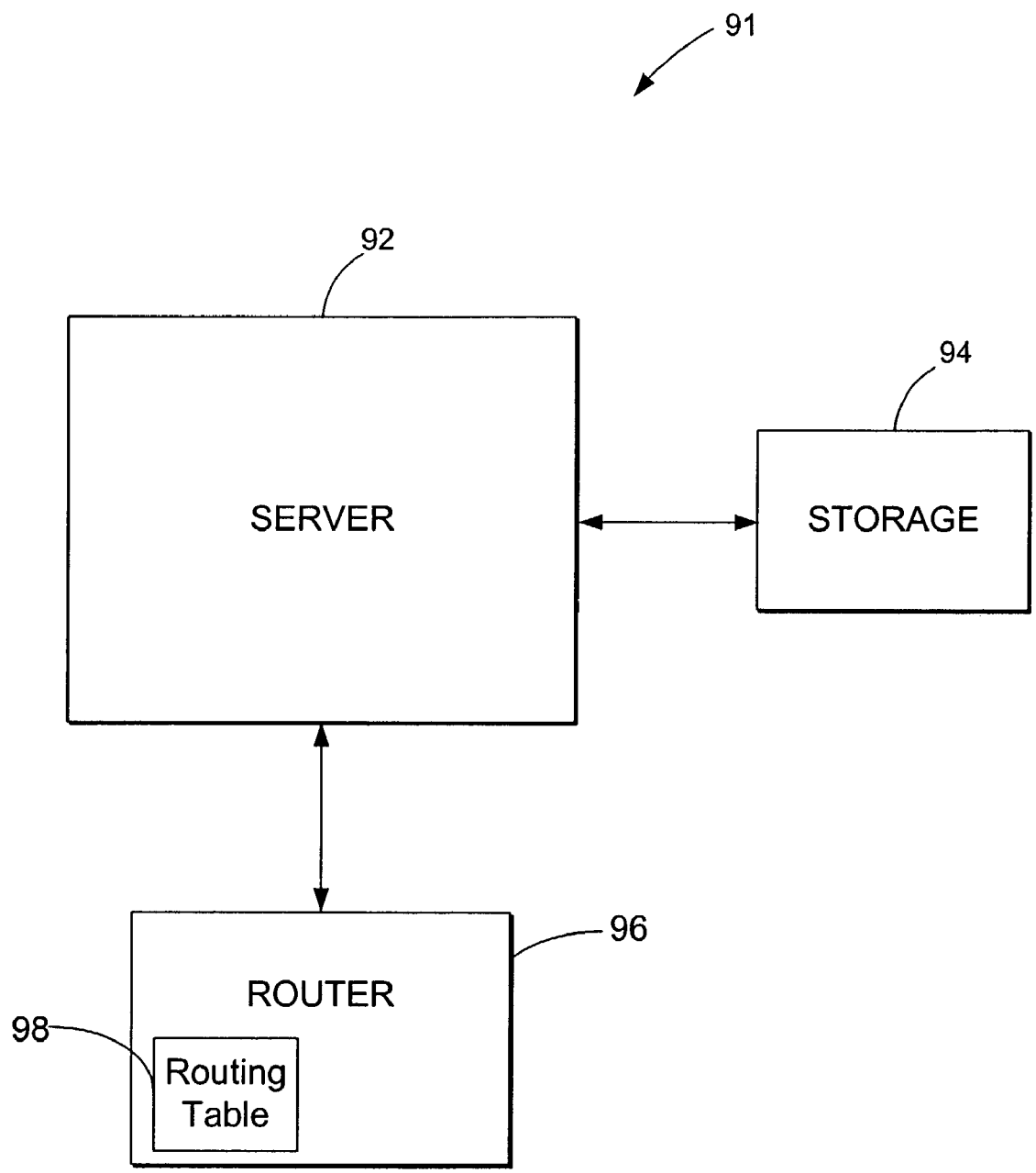
FIG. 3 is a block diagram of an exemplary central office, in accordance with an embodiment of the invention.

As described above in relation to FIG. 2, a central office may itself be a client-server network ("central office network"). A central office network 91 of an exemplary embodiment of the invention is illustrated in FIG. 3. The central office network 91 generally comprises at least a server 92, a data store 94 and a router 96. However, the central office network 91, as with any client-server network, may comprise a variety of additional elements.

A server 92 of a central office network 91 (referred to herein as a central office server) may function as a typical server in a client-server network. Thus, a central office server may perform the bulk of the centralized or generalized tasks in the central office network. Alternatively, the central office server may function as a specialized server.

The central office network 91 includes storage for data (referred to herein as a "data store") 94. The data store may be located within the server or external to the server. The data store 94 in an exemplary embodiment of the invention may be a cache, a database or a data repository.

Information may be stored in the data store for a variety of reasons. One reason is to provide a requestor with faster access to the information. If a request for information can be fulfilled at the central office network, then the request does not need to be routed to the network core 80 or to another element within the network. Another reason is to reduce the amount of network traffic. If frequently accessed information is stored in the data store, then the request and the information are not sent repeatedly across the network. Typically, static information is stored in the data store. Static information is information that does not change rapidly. Dynamic information is information that changes rapidly, such as a stock quote. Typically, dynamic information is not stored in the data store because a requestor is seeking the most current information.

The central office network 91 may also contain a router 96. The router 96 in a client-server network may refer to a hardware configuration, a software configuration, or a combination thereof. In one hardware configuration, the router 96, may act as a central switching office for a telephone network. In one embodiment, the router is an ALTEON switch provided by Nortel Networks. An ALTEON switch can examine HTTP headers to determine details of a request, such as an IP address. The router 96 in a software configuration may be a program or function that directs the flow of information by directing requests and satisfied requests. Thus, the router 96 in the central office network 91 may direct a request to the appropriate entity within the network 70. For example, the router may direct a request to another central office or to a network core.

Additionally, the router 96 may be associated with a routing table 98 that includes routing instructions. The routing instructions assist the router in routing a request. Routing instructions may be based on routing parameters that correspond to various characteristics of the request or the network. For example, a routing instruction may be based on a specified interval of time, a specified load on the central office, or a specified subject matter within a request. The routing table may include an index of the information stored at some or all of the other central offices in the network to support routing based on subject matter. If so, then the router uses the index to determine that the requested information is available at another central office and routes the request to another central office, rather than routing the request to the core. A routing instruction may also instruct a router to provide requests to another central office once the central office associated with the router reaches a predetermined load. Redirecting the request helps balance the loads of the central offices.

Alternatively, or in addition, the router may keep track of the information available at one or more of the other central offices. If so, then the central office routes a request based on the information requested. The information regarding the information available at the other central offices may be maintained in the routing table or in any other suitable manner.

If the central office cannot satisfy the request and a routing instruction does not apply, then the central office routes the request according to a default routing instruction. In one embodiment, the default routing instruction specifies a nearby central office. The concept of "nearness" refers not only to physical proximity, but also to quality of service. For example, the central office may maintain a look-up table that stores information about the other central offices, such as the distance to the other central offices in miles or the number of hops to the other central offices. The central office may also maintain information about previous requests sent to other central offices, such as the time it took for another central office to satisfy a previous request. Thus, a nearby central office includes a central office that may be physically remote, but that provides a quick response. If the central office maintains information about the other central offices, then it can use the information to route the request in a manner that minimizes the traffic on the network. In another embodiment, the default routing instruction specifies the network core.

A central office may utilize a set of default routing instructions. The applicable default routing instruction may vary based upon the time of day and/or day of week. In addition a central office may default to routing requests in a round robin fashion to a number of central offices.

Method for Routing a Request

Figure 4:
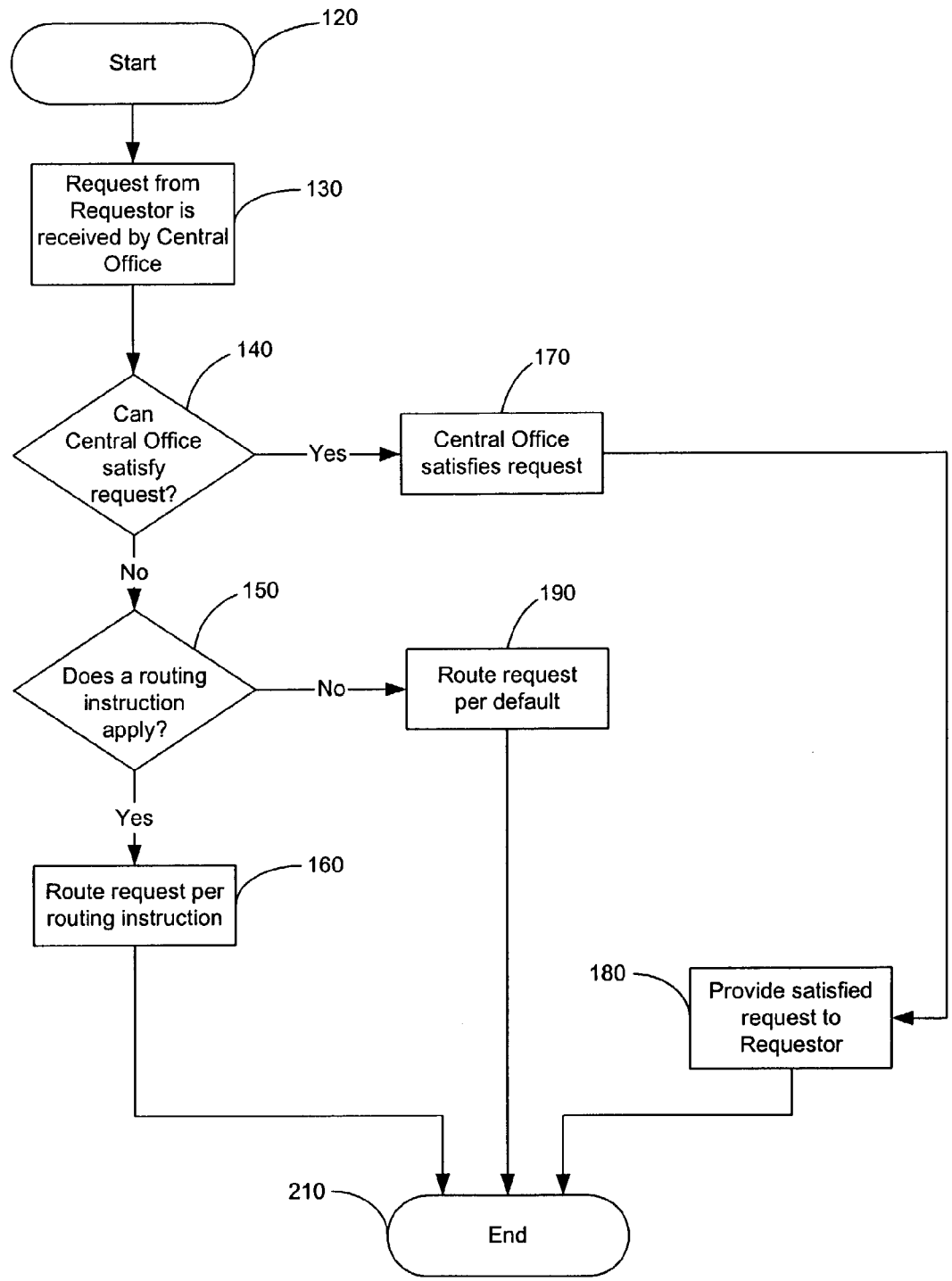
FIG. 4 is a flow diagram of an exemplary method for routing a request, in accordance with an embodiment of the invention.

Turning to FIG. 4, there is shown a flow diagram illustrating an exemplary method for routing a request. After the start in action 120, the central office receives a request from a requestor in action 130. A request may be for any type of information, including but not limited to graphics, image files, text, video, etc. For example, the request may be a request to view a particular internet site or to download a video of a sales presentation. The sales presentation may be accessible from the internet or from an intranet. Once the request is received, a determination is made in action 140 as to whether the central office can fulfill or satisfy the request.

A central office may be able to fulfill the request with information contained within or associated with the central office data store. As discussed above in reference to FIG. 3, information can be stored in the central office data store. For example, a video of a sales presentation that is accessed via a company's intranet by a number of remote offices may be stored in the central office data stores of the central offices serving the company's remote offices to minimize network traffic when the video is requested.

If the determination is that the central office can satisfy the request, then the YES branch is followed and the central office satisfies the request in action 170. Typically, the determination that the central office can satisfy the request is made if the central office can provide the requested information from its own data store. However, a central office may satisfy a request utilizing information from any entity within the central office network. The satisfied request is provided to the requestor in action 180. The terms fulfilled request and satisfied request are used interchangeably herein. Thereafter, the method ends at action 210.

If the central office cannot fulfill the request, then the NO branch is followed and a determination is made in decision block 150 as to whether a routing instruction applies. In one embodiment, a routing instruction applies if the request or the network conditions satisfies a routing parameter. For example, a routing parameter may be a specified interval of time, a specified load on the central office, or a specified subject matter within a request. The routing instructions instruct the central office to route the request to a particular network element, such as the network core or another central office. If a routing instruction applies, then the method proceeds along the YES branch from action 150 to action 160. In action 160 the request is routed according to the routing instruction.

If the routing instruction indicates that the request should be routed to the network core, then the central office routes the request to the network core in step 160. Once the central office receives the satisfied request from the central core, the central office provides the satisfied request to the requester.

If a routing instruction does not apply, then the method proceeds along the NO branch to action 190. In action 190, the request is routed according to a default routing instruction. Once the central office routes the request, the method ends at action 210.

In the embodiment illustrated by FIG. 4, the satisfied request is provided to the requestor by the central office that provides the information. In another embodiment, the satisfied request is provided to the requestor by the central office that initially received the request. If the central office that initially received the request determines that the requested information is likely to be requested again by the requester or by another requester associated with the central office, then the central office caches the information and provides the information to the requester.

In some situations, a central office may be able to satisfy a portion of the request. If so, then the method proceeds from action 140 to action 170 for the portion of the request that can be satisfied by the central office and from action 140 to action 150 for the portion of the request that cannot be satisfied by the central office. In one embodiment, the satisfied portion of the request is stored in the central office until the unsatisfied portion of the request is satisfied. Once the unsatisfied portion of the request is satisfied, both portions of the request are provided to the requestor at the same time. As an example, a requestor may request a web page that includes both cacheable and non-cacheable information. Non-cacheable information includes dynamic information and information marked as non-cacheable by a cache control header. The central office that initially received the request may cache the cacheable information. If the central office receives another request for the web page, then the central office retrieves the cacheable information from its cache and retrieves the non-cacheable information from another central office or the network core. Thus, caching is not limited to caching an entire page. In another embodiment, the satisfied portion of the request is immediately provided to the requestor and the central office provides the unsatisfied portion of the request when it becomes satisfied.

In one embodiment a counter is used to avoid endlessly forwarding the request. The counter is set to a predetermined number by the central office that initially receives the request from the computer. Each time the request is forwarded, the counter is decremented. Once the counter reaches zero, the request is not forwarded to another central office, it is sent to the network core.

The exemplary embodiments of the present invention were chosen and described above in order to explain the principles of the invention and their practical applications so as to enable others skilled in the art to utilize the invention including various embodiments and various modifications as are suited to the particular use contemplated. The examples provided herein in the written descriptions or in the drawings are not intended as limitations of the present invention. Other embodiments will suggest themselves to those skilled in the art. Therefore, the scope of the present invention is to be limited only by the claims below.

What is claimed is:

1. A method for routing a request by a first edge client, the method comprising:
   receiving the request at the first edge client located at an edge of a network;
   in response to receiving the request, determining whether the first edge client can satisfy the request;
   if the first edge client can satisfy the request, then providing a satisfied request;
   if the first edge client cannot satisfy the request, then determining whether a routing instruction that identifies a second edge client located at the edge of a network applies, the routing instruction being based on at least one of the following: a specific interval of time, a specific load on the first edge client, and a specific subject matter within the request;

if the routing instruction applies, then routing the request to the second edge client, the routing being performed by a router having access to a routing table containing the routing instruction, the router being operatively associated with the first edge client, wherein the router further provides a central office switching function for a communication network;

if the routing instruction does not apply, then routing the request according to a default routing instruction identifying a nearby edge client, wherein identifying the nearby edge client comprises evaluating physical proximity, a number of network hops to the nearby edge client, and information maintained about previous requests routed to the nearby edge client;

determining whether the first edge client can satisfy a first portion of the request;

if the first edge client can satisfy the first portion of the request, then routing a second portion of the request to the second edge client according to one of the following: the routing instruction, and the default routing instruction;

determining whether the second edge client can satisfy the second portion of the request; and providing the first portion of the request and the second portion of the request, wherein providing the first portion of the request and the second portion of the request comprises one of the following:

providing the first portion of the request when the first portion of the request has been satisfied by the first edge client and subsequently providing the second portion of the request when the second portion of the request has been satisfied by the second edge client, and providing the first portion of the request and the second portion of the request simultaneously, wherein providing the first portion of the request and the second portion of the request simultaneously comprises:

storing the first satisfied portion of the request until the second portion of the request is satisfied, and once the second portion of the request is satisfied by the second edge client, combining the first portion of the request and the second portion of the request, and providing the combined first portion of the request and second portion of the request.

2. The method of claim 1, wherein determining whether the routing instruction applies comprises:

comparing a first routing parameter associated with the request to a second routing parameter associated with the routing instruction.

3. The method of claim 2, wherein the first routing parameter associated with the request specifies a subject.

4. The method of claim 1, wherein determining whether the routing instruction applies comprises:

comparing a first routing parameter associated with the request to a second routing parameter associated with a network condition.

5. The method of claim 4, wherein the first routing parameter associated with the network condition specifies a time interval.

6. The method of claim 4, wherein the first routing parameter associated with the network condition specifies a load.

7. The method of claim 1, wherein the default routing instruction identifies a network core.

8. The method of claim 1, wherein if the first edge client cannot satisfy the request, then determining whether the routing instruction applies comprises identifying the second edge client applies comprises identifying the second edge client using the routing table containing at least one of the following: an index of information stored at the second edge client, a geographic distance between the edge client and the second edge client, a number of hops between the edge client and the second edge client, and a time required for the second edge client to fulfill a previous request.

9. A method for routing a request by a first edge client, the method comprising:

receiving the request at the first edge client;

in response to receiving the request, determining whether the first edge client can satisfy a first portion of the request;

if the first edge client can satisfy the first portion of the request, then obtaining the satisfied first portion of the request;

determining whether a routing instruction that identifies a second edge client located at the edge of a network applies, the routing instruction being based on at least one of the following: a specific interval of time, a specific load on the first edge client, and a specific subject matter within the request;

if the routing instruction applies, routing a second portion of the request to a second edge client, the first edge client being operatively connected to the second edge client with a network connection, the routing being performed by a router having access to a routing table containing the routing instruction, the router being operatively associated with the first edge client, wherein the router further provides a central office switching function for a communication network; and if the routing instruction does not apply, then routing the second portion of the request according to a default routing instruction identifying a nearby edge client, wherein identifying the nearby edge client comprises evaluating physical proximity, a number of network hops to the nearby edge client, and information maintained about previous requests routed to the nearby edge client; and providing the first portion of the request and the second portion of the request, wherein providing the first portion of the request and the second portion of the request comprises one of the following:

providing the first portion of the request when the first portion of the request has been satisfied by the first edge client and subsequently providing the second portion of the request when the second portion of the request has been satisfied by the second edge client, and providing the first portion of the request and the second portion of the request simultaneously, wherein providing the first portion of the request and the second portion of the request simultaneously comprises:

storing the first satisfied portion of the request until the second portion of the request is satisfied, and once the second portion of the request is satisfied by the second edge client, combining the first portion of the request and the second portion of the request, and providing the combined first portion of the request and second portion of the request.

10. The method of claim 9, further comprising:

receiving the second portion of the request from the second edge client.

11. A network system comprising:

a plurality of edge network clients, each edge network client being configured as a central office network having a central office server, a central office data store, and a central office router, each edge network client being connected to at least one other of the plurality of edge network clients, each edge network client being operable to receive a request, examine the request, determine whether a routing instruction identifying another edge network client applies, wherein the routing instruction is based on at least one of the following: a specific interval of time, a specific load on a one of the plurality of edge network clients corresponding to the central office router, and a specific subject matter within the request, and, if the routing instruction applies, each edge network client being operable to route the request to another edge network client, wherein routing the request to another edge network client comprises routing a first portion of the request if a second portion of the request is satisfied by the edge network client receiving the request, the routing being performed by the central office router having access to a routing table containing the routing instruction, wherein the central office router further provides a central office switching function for a communication network, and, if the routing instruction does not apply, each edge network client being operable to route the request according to a default routing instruction identifying a nearby edge client, wherein identifying the nearby edge client comprises evaluating physical proximity, a number of network hops to the nearby edge client, and information maintained about previous requests routed to the nearby edge client; and a network core having a core server and a data source connected to at least one of the plurality of the edge network clients.

12. The system of claim 11, wherein the edge network client is configured to examine the request using the central office router to examine a header associated with the request.

13. The system of claim 11, wherein the routing table is associated with the central office router and the routing table includes a plurality of routing instructions based on routing parameters that correspond to network conditions.

14. The system of claim 11, wherein the routing table is associated with the central office router and the routing table includes a plurality of routing instructions based on routing parameters that correspond to the request.

15. The system of claim 11, wherein each edge network client is further operative to determine whether the edge network client can satisfy a portion of the request and if the edge network client can satisfy a portion of the request, then route an unsatisfied portion of the request.

16. The system of claim 15, wherein each edge network client can satisfy the portion of the request if the portion of the request corresponds to information stored in the central office data store.

17. The system of claim 11, wherein each edge network client determines whether a routing instruction identifying another edge network client applies, and routes the request to the other edge network client further comprises identifying another edge network client by receiving information available at the other edge network client and storing the information in the routing table.

* * * * *